United States Patent
Ochiai et al.

(10) Patent No.: US 6,960,153 B2
(45) Date of Patent: Nov. 1, 2005

(54) CLUTCH ENGAGEMENT CONTROL OF AUTOMATIC TRANSMISSION

(75) Inventors: Tatsuo Ochiai, Fuji (JP); Yusuke Kimura, Fuji (JP); Yoshichika Hagiwara, Fuji (JP); Hironobu Waki, Fuji (JP); Katsumi Doihara, Fuji (JP); Hiroyasu Tanaka, Fuji (JP); Hirofumi Okahara, Fuji (JP)

(73) Assignee: Jatco Ltd, Fuji (JP)

( * ) Notice: Subject to any disclaimer, the term of this patent is extended or adjusted under 35 U.S.C. 154(b) by 54 days.

(21) Appl. No.: 10/787,832

(22) Filed: Feb. 27, 2004

(65) Prior Publication Data

US 2004/0220016 A1  Nov. 4, 2004

(30) Foreign Application Priority Data

Feb. 28, 2003 (JP) .............................. 2003-052713

(51) Int. Cl.[7] ............................................ B60K 41/04
(52) U.S. Cl. ................... 477/107; 477/110; 477/111; 477/44; 477/45; 477/46; 477/48; 477/906
(58) Field of Search ................... 477/107, 110, 111, 477/44, 45, 46, 48, 906; 74/473.12

(56) References Cited

U.S. PATENT DOCUMENTS

| | | | |
|---|---|---|---|
| 4,748,870 A | * | 6/1988 | Sugino et al. .............. 477/117 |
| 5,018,068 A | * | 5/1991 | Aoki et al. .................... 701/53 |
| 5,050,454 A | * | 9/1991 | Yamaguchi et al. ........ 477/109 |
| 5,583,768 A | * | 12/1996 | Hamajima et al. ............ 701/53 |
| 5,908,368 A | * | 6/1999 | Sawamura et al. .......... 477/109 |
| 6,464,617 B1 | | 10/2002 | Lee |
| 6,793,606 B2 | | 9/2004 | Doh |

FOREIGN PATENT DOCUMENTS

| DE | 101 56 981 A1 | 7/2002 |
|---|---|---|
| EP | 1 271 006 A2 | 1/2003 |
| JP | 2002-310292 A | 10/2002 |

* cited by examiner

*Primary Examiner*—Charles A Marmor
*Assistant Examiner*—David D. Le
(74) *Attorney, Agent, or Firm*—Foley & Lardner LLP

(57) ABSTRACT

A clutch engagement control device controls the engagement of a forward clutch (32) and reverse clutch (33) in an automatic transmission connected to an engine (70) in a vehicle. An inhibitor switch (56) outputs a range signal in accordance with a position range of a select lever (51). A manual valve (57) supplies oil pressure selectively to one of the forward clutch (32) and the reverse clutch (33) by changing position in accordance with the position range of the select lever (51). A controller (60) of the clutch engagement control device determines whether an unmatching range condition occurs in which the range of the select lever (51) indicated by the range signal and the range of the manual valve (57) do not match, when the range of the select lever (51) indicated by the range signal is a drive range or reverse range; and suppress an increase in engine rotation speed prior to engagement of the forward clutch or reverse clutch when the unmatching range condition occurs.

9 Claims, 6 Drawing Sheets

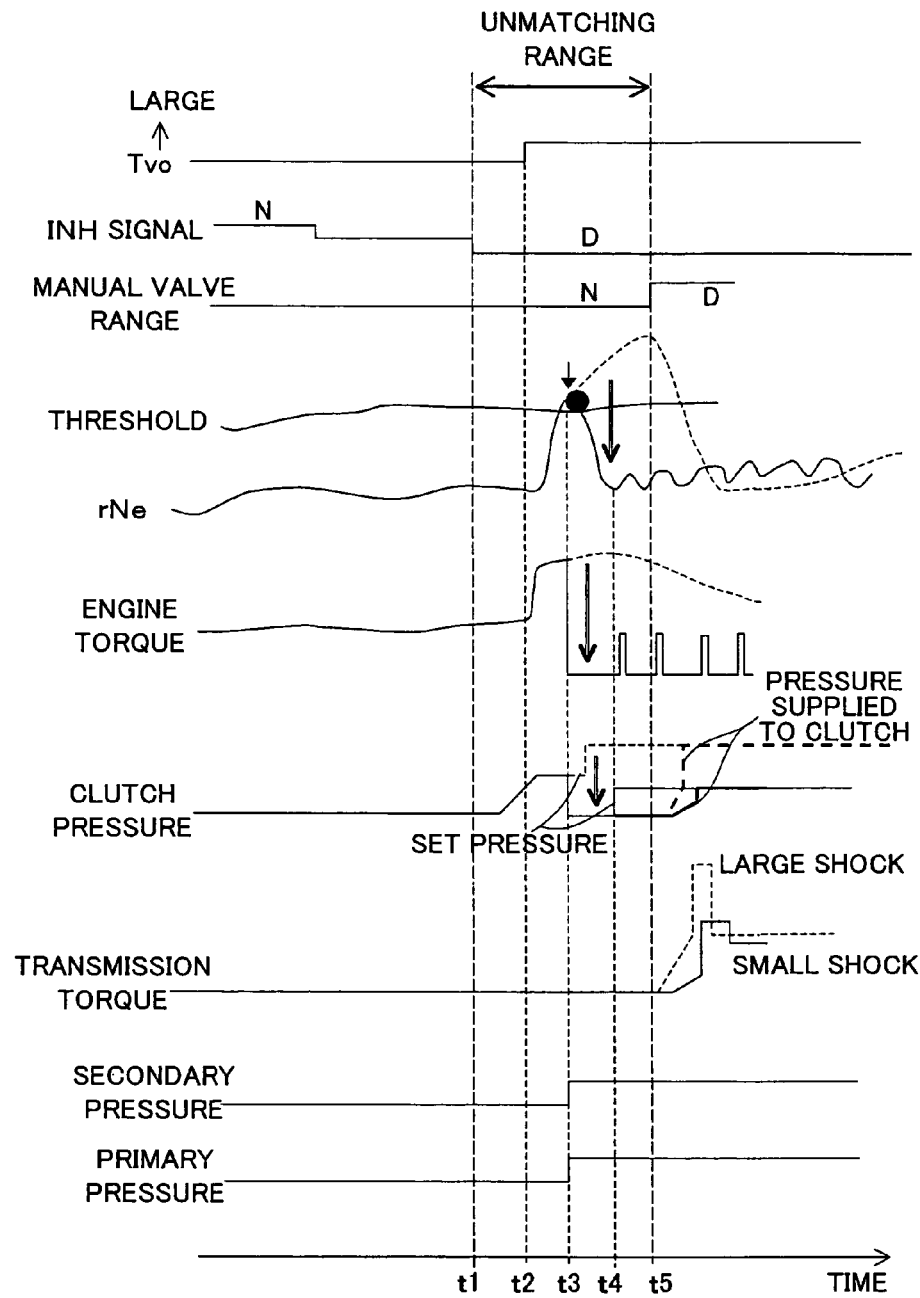

CLUTCH ENGAGEMENT CONTROL OF AUTOMATIC TRANSMISSION

FIELD OF THE INVENTION

This invention relates to a clutch engagement control device for an automatic transmission which is suitable for use in a vehicle.

BACKGROUND OF THE INVENTION

In an automatic transmission for use in a vehicle, an operation of a select lever by a driver is detected by an inhibitor switch. The operating range of the automatic transmission is determined on the basis of a range signal (INH signal) from the inhibitor switch. Tokkai 2002-310292, published in Japan in 2002, discloses a control device which controls the engagement and disengagement of a forward clutch or reverse clutch (reverse brake) by means of hydraulic control. In such a control device, a manual valve is moved on the basis of a select lever operation performed by the driver, whereby oil pressure is supplied selectively to the forward clutch and reverse clutch. The position ranges of the manual valve include a drive range (D range) corresponding to the D range of the automatic transmission, a reverse range (R range) corresponding to the R range of the automatic transmission, and an N range corresponding to the N range of the automatic transmission. In the D range of the manual valve, oil pressure is supplied only to the forward clutch. In the R range of the manual valve, oil pressure is supplied only to the reverse clutch. In the N range of the manual valve, no oil pressure is supplied to either the forward clutch or the reverse clutch.

SUMMARY OF THE INVENTION

In a clutch engagement control device for an automatic transmission, however, if a delay occurs between an operation of the select lever by the driver (in other words, change of an INH signal) and movement of the manual valve, drivability deteriorates. Moreover, if the manual valve does not move well, the manual valve may remain in the N range even when the driver selects the D range from the N range. If the driver presses the accelerator pedal while the manual valve is in the N range such that the engine is running at no load, and the manual valve then switches to the D range belatedly, the forward clutch may be engaged. In this case, a large shock occurs upon engagement, causing a possible deterioration in drivability.

An object of this invention is to prevent a deterioration in drivability even when there is a delay between an operation of the select lever by a driver and movement of the manual valve.

In order to achieve the above object, this invention provides a clutch engagement control device which controls the engagement of a forward clutch and reverse clutch in an automatic transmission connected to an engine in a vehicle. The forward clutch is capable of transmitting a drive force of the engine for advancing the vehicle and the reverse clutch is capable of transmitting the drive force of the engine for reversing the vehicle. Operating ranges of the automatic transmission include a drive range which advances the vehicle, a reverse range which reverses the vehicle and a stopping range which stops the vehicle. The clutch engagement control device comprises a select lever which selects the operating range of the automatic transmission; and an inhibitor switch which outputs a range signal in accordance with a position range of the select lever. The position range of the select lever indicates the selected operating range of the automatic transmission and the range signal indicates the position range of the select lever. The clutch engagement control device further comprises a manual valve which supplies oil pressure selectively to one of the forward clutch and the reverse clutch by changing position in accordance with the position range of the select lever. Position ranges of the manual valve include a drive range in which only the forward clutch is engaged, a reverse range in which only the reverse clutch is engaged, and a stopping range in which both the forward clutch and reverse clutch are released. The clutch engagement control device yet further comprises an oil pressure adjustment device which adjusts an oil pressure that is supplied to the manual valve; and a controller electrically coupled to the engine and the oil pressure adjustment device. The controller functions to determine whether an unmatching range condition occurs in which the range of the select lever indicated by the range signal and the range of the manual valve do not match, when the range of the select lever indicated by the range signal is the drive range or reverse range; and suppress an increase in engine rotation speed prior to engagement of the forward clutch or reverse clutch when the unmatching range condition occurs.

In order to achieve the above object, this invention further provides a clutch engagement control method for controlling the engagement of a forward clutch and reverse clutch in an automatic transmission connected to an engine in a vehicle. The clutch engagement control method comprises the steps of determining whether an unmatching range condition occurs in which the range of the select lever indicated by the range signal and the range of the manual valve do not match, when the range of the select lever indicated by the range signal is the drive range or reverse range; and suppressing an increase in engine rotation speed prior to engagement of the forward clutch or reverse clutch when the unmatching range condition occurs. The clutch engagement control method further comprises the steps of controlling the oil pressure adjustment device such that the oil pressure supplied to the manual valve is set to zero and subsequently controlling the oil pressure adjustment device such that the oil pressure supplied to the manual valve is set to an intermediate pressure, prior to engagement of the forward clutch or reverse clutch when the unmatching range condition occurs.

The details as well as other features and advantages of this invention are set forth in the remainder of the specification and are shown in the accompanying drawings.

BRIEF DESCRIPTION OF THE DRAWINGS

FIG. 6 is a view illustrating the effects of the control of this invention. FIG. 6A shows time variation in a throttle valve opening (Tvo). FIG. 6B shows time variation in an INH signal. FIG. 6C shows time variation in the position range of the manual valve. FIG. 6D shows time variation in a threshold relating to the engine rotation speed. FIG. 6E shows time variation in a real value (rNe) of the engine rotation speed. FIG. 6F shows time variation in the engine torque. FIG. 6G shows time variation in the clutch pressure. FIG. 6H shows time variation in the transmission torque of the clutch. FIG. 6I shows time variation in a secondary pressure. FIG. 6J shows time variation in a primary pressure.

PREFERRED EMBODIMENTS OF THE INVENTION

Figure 1:
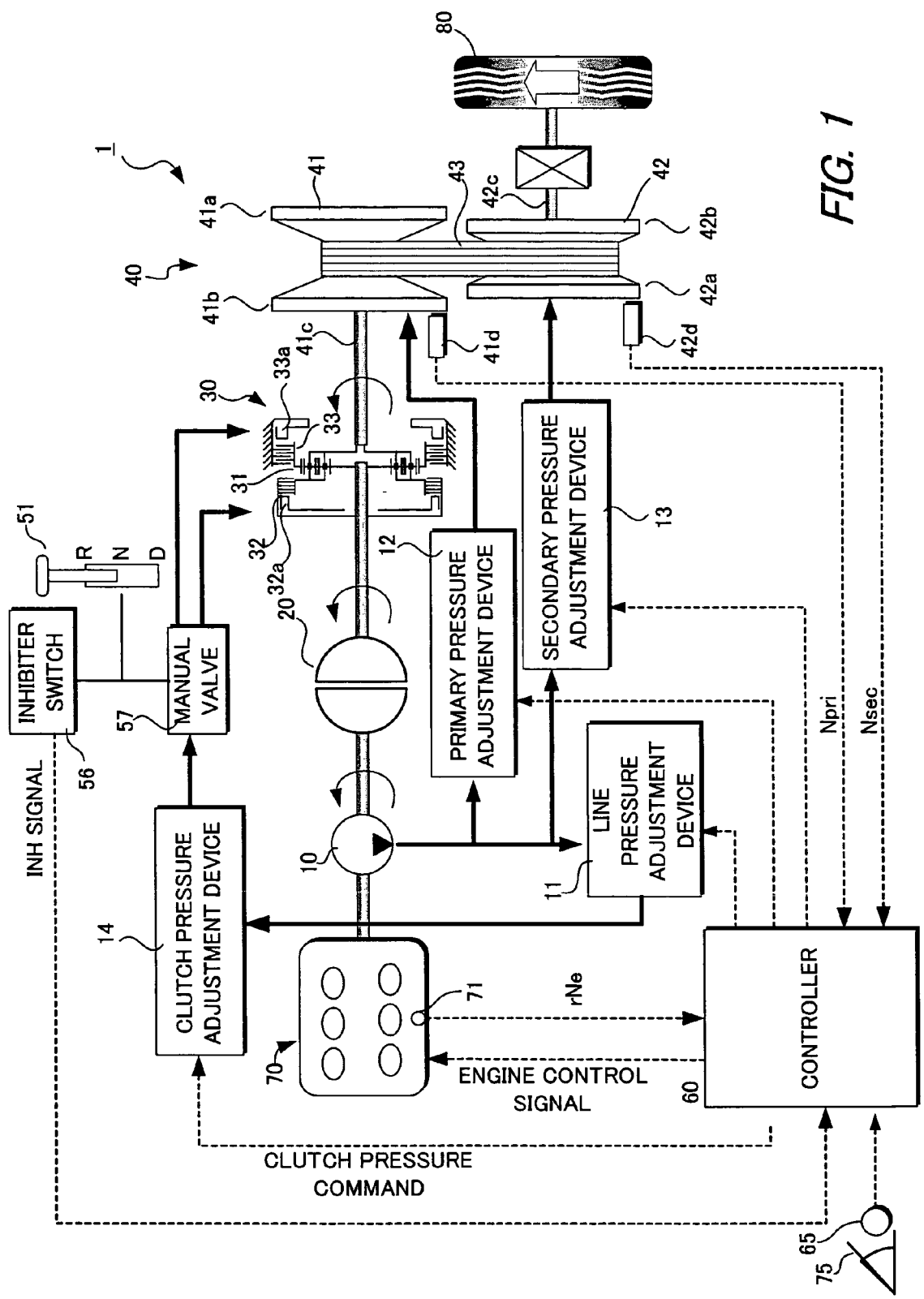
FIG. 1 is a schematic diagram showing an embodiment of a clutch engagement control device for an automatic transmission according to this invention.

Referring to FIG. 1, an automatic transmission comprises a hydraulic pump 10, a torque converter 20, a forward/reverse change-over device 30, and a continuously variable transmission portion 40 (CVT portion). The automatic transmission is controlled by a controller 60. Torque from an engine 70 is input into the automatic transmission, whereupon the torque is converted and output to a driving wheel 80 (or driving wheels).

The engine 70 is provided with a fuel injector for injecting fuel into a combustion chamber of the engine and a throttle valve for controlling air flow to an engine cylinder.

The hydraulic pump 10 is driven by the rotation of the engine 70 to pump oil at pressure. The pumped oil pressure is adjusted by a line pressure adjustment device 11. The adjusted oil pressure is also adjusted by a primary pressure adjustment device 12 and a secondary pressure adjustment device 13, and then supplied to a primary pulley 41 and a secondary pulley 42 of the continuously variable transmission portion (CVT portion). The primary pulley 41 and secondary pulley 42 are operated by the oil pressure to change speed. The oil pressure that bifurcates at the line pressure adjustment device 11 is sent to a clutch pressure adjustment device 14 for controlling the clutch pressure, and then to a forward clutch piston chamber 32a and a reverse clutch piston chamber 33a via a manual valve 57. In this manner, clutch engagement is controlled.

The torque converter 20 is provided between the engine 70 and the forward/reverse change-over device 30, and transmits the driving force of the engine 70 in accordance with the flow of oil in the interior thereof. The torque converter 20 is provided with a lock-up mechanism to eliminate the rotational difference between the pump impeller and the turbine liner.

The forward/reverse change-over device 30 comprises a planetary gear set 31, a forward clutch 32, and a reverse clutch 33 for switching the power transmission path between the engine side and the CVT portion side. The forward clutch 32 is connected to a forward clutch piston, and is engaged with the planetary gear set 31 by oil pressure (forward clutch pressure) supplied to the forward clutch piston chamber 32a when the vehicle is to advance. The reverse clutch 33 is connected to a reverse clutch piston, and is engaged with the planetary gear set 31 by the force of oil pressure (reverse clutch pressure) supplied to the reverse clutch piston chamber 33a when the vehicle is to reverse. In the stopping range of the automatic transmission (the neutral range or parking range), no oil pressure is supplied, and both the forward clutch 32 and reverse clutch 33 are disengaged. When the forward clutch 32 is engaged with the planetary gear set 31, positive rotation is output from the automatic transmission to an output shaft 42c, and when the reverse clutch 33 is engaged with the planetary gear set 31, counter-rotation is output from the automatic transmission to the output shaft 42c.

Engagement of the forward clutch 32 and reverse clutch 33 is performed selectively. For the vehicle to advance, forward clutch pressure is supplied such that the forward clutch 32 is engaged, and the reverse clutch piston chamber 33a is connected to a drain such that the reverse clutch pressure is released. For the vehicle to reverse, the forward clutch piston chamber 32a is connected to a drain such that the forward clutch pressure is released, and reverse clutch pressure is supplied such that the reverse clutch 33 is engaged. In the stopping range of the automatic transmission (the neutral range or parking range), the forward clutch pressure and reverse clutch pressure are both released to a drain.

The CVT portion 40 comprises the primary pulley 41, the secondary pulley 42, and a V-belt 43. The primary pulley 41 is an input shaft side pulley for inputting the driving force of the engine 70. The primary pulley 41 comprises a fixed conical plate 41a which rotates integrally with an input shaft 41c, and a movable conical plate 41b which opposes the fixed conical plate 41a to form a V-shaped pulley groove. The movable conical plate 41b can be displaced in the axial direction by the oil pressure (to be referred to as primary pressure below) which acts on the primary pulley. The rotation speed Npri (input rotation speed) of the primary pulley 41 is detected by a primary pulley rotation speed sensor 41d.

The secondary pulley 42 transmits the driving force transmitted by the V-belt 43 to the driving wheel 80 via an idler gear and a differential gear. The secondary pulley 42 comprises a fixed conical plate 42a which rotates integrally with an output shaft 42c, and a movable conical plate 42b which opposes the fixed conical plate 42a to form a V-shaped pulley groove. The movable conical plate 42b can be displaced in the axial direction in accordance with the oil pressure (to be referred to as secondary pressure below) which acts on the secondary pulley. The pressure-receiving surface area of the secondary pulley and the pressure-receiving surface area of the primary pulley are substantially equal. The rotation speed (output rotation speed) of the secondary pulley 42 is detected by a secondary pulley rotation speed sensor 42d. The vehicle speed is calculated from the rotation speed Nsec of the secondary pulley 42.

The V-belt 43 is wrapped around the primary pulley 41 and secondary pulley 42, and transmits the driving force input into the primary pulley 41 to the secondary pulley 42.

Signals from the primary pulley rotation speed sensor 41d and secondary pulley rotation speed sensor 42d are inputted into the controller 60, and the current speed ratio is calculated from these signals. The primary pressure and secondary pressure are then controlled to reach a target speed ratio. A signal from a stroke sensor 65 which detects the stroke of the accelerator pedal 75, a signal from an engine rotation speed sensor 71 which detects the engine rotation speed, and a signal from an inhibitor switch 56 which detects the position of a select lever 51 (selecting switch) are also input into the controller 60.

Figure 2:
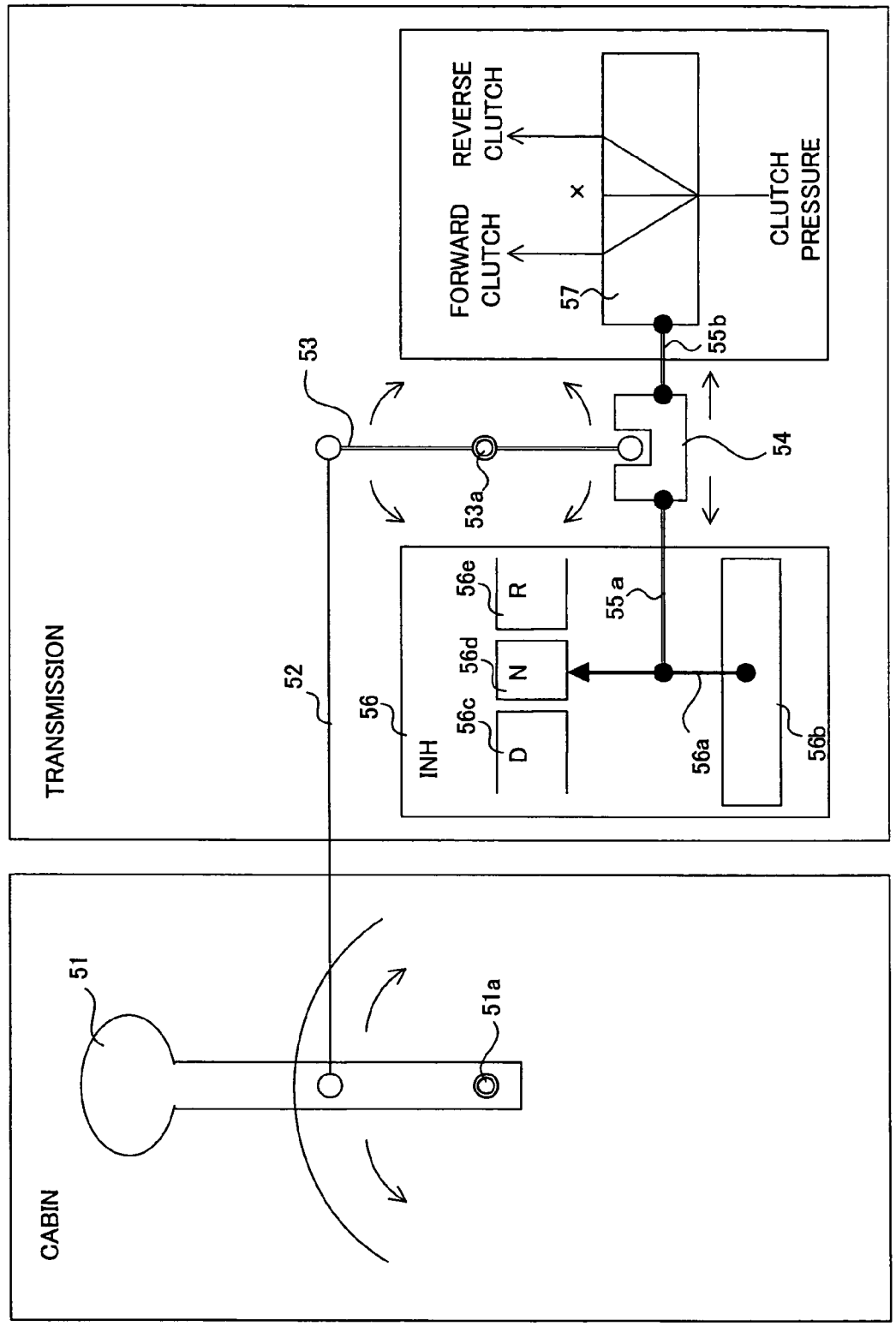
FIG. 2 is a schematic diagram showing a part of the constitution of a transmission and clutch engagement control device.

Referring to FIG. 2, the select lever 51 is rotatable about a fulcrum 51a. The select lever 51 is connected to one end of a wire 52. The other end of the wire 52 is connected to one end of a link 53. The link 53 performs a rotary motion about a fulcrum 53a. The other end of the link 53 is connected to a slider 54. The slider 54 is connected to a switch rod 56a of the inhibitor switch 56 via a connecting rod 55a. The switch rod 56a establishes an electrical connection with a power source terminal 56b and any one of a D range terminal 56c, an N range terminal 56d, and an R range terminal 56e. The slider 54 is also connected to the manual valve 57 via a connecting rod 55b.

When the driver operates the select lever 51 in the directions shown by the arrows, the link 53 rotates via the wire 52 in the directions shown by the arrows. This causes the slider 54 to move in the directions shown by the arrows. The switch rod 56a moves in accordance with the movement of the slider 54 to enter a conducting state with the power source terminal 56b and any one of the D range terminal 56c, N range terminal 56d, and R range terminal 56e. Simultaneously, the manual valve 57 changes position in accordance with the movement of the slider 54 so as to switch the path of the oil pressure that is supplied to the forward/reverse change-over device 30.

Figure 3:
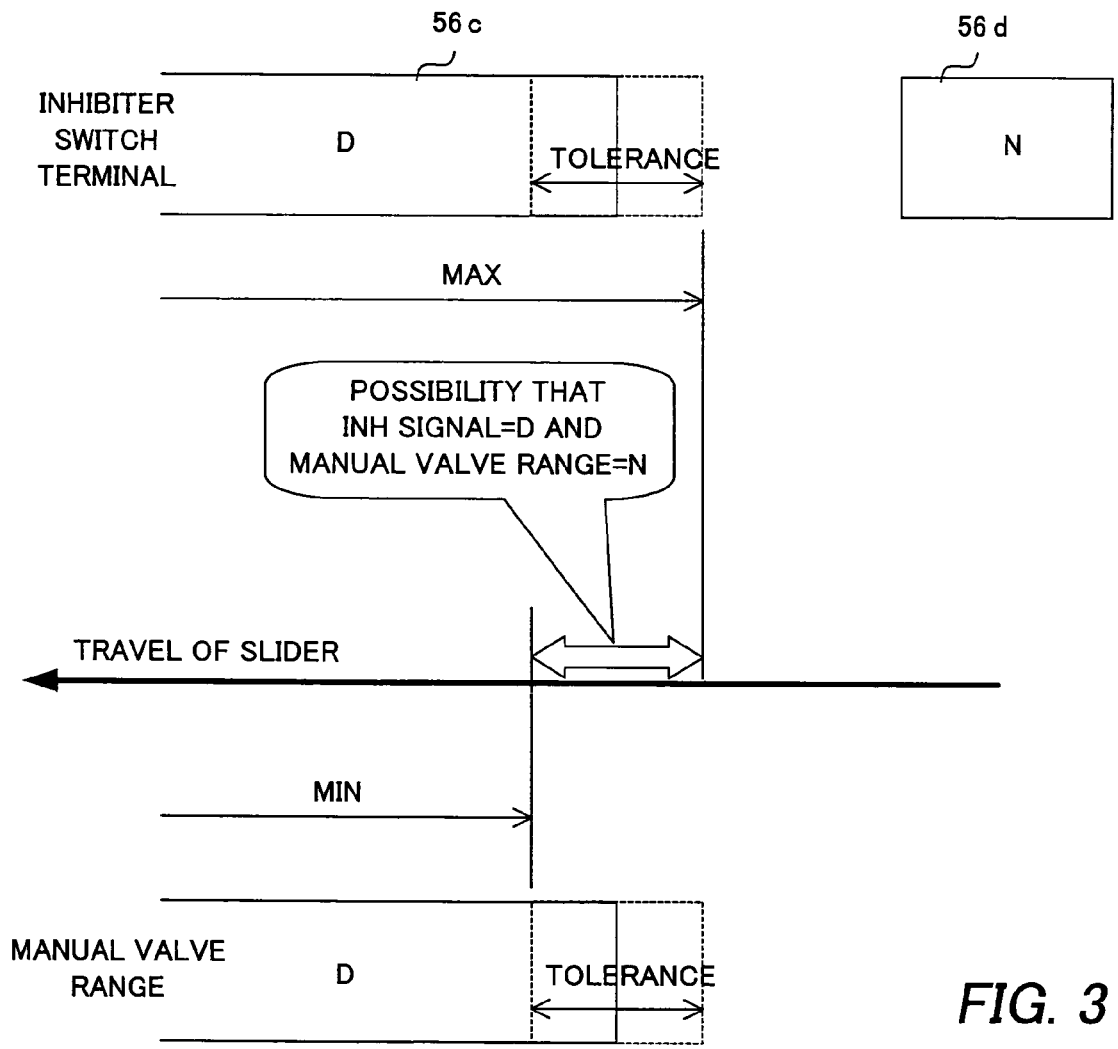
FIG. 3 is a view showing tolerances of a conducting region of an inhibitor switch and tolerances of an oil pressure generating region of a manual valve.

FIG. 3 is a view showing the tolerance of the conducting region of the inhibitor switch and the tolerance of the oil pressure generating region of the manual valve in relation to the travel of the slider 54. The terminal part of the inhibitor switch 56 constitutes the conducting region. The manufacturing tolerances of the terminal part may lead to variation in the conducting region. For example, a tolerance as shown by the dotted lines in FIG. 3 may be produced in the D range terminal 56c. Variation may also occur in the D range oil pressure generating region of the manual valve due to manufacturing tolerances.

As a result, a situation may arise in which the ranges of the inhibitor switch 56 and the manual valve 57 do not match even though setting of the inhibitor switch 56 and the manual valve 57 is performed by a single slider 54. For example, if the D range terminal 56c of the inhibitor switch is at its maximum size and the D range oil pressure generating region of the manual valve is at its minimum size, then within the range shown by the outlined arrow in the drawing, the inhibitor switch 56 is in the D range but the manual valve is in the N range in relation to the travel of the same slider 54. Such a condition is known as an unmatching range condition. In the unmatching range condition, a mismatch between the select lever range indicated by the INH signal and the range of the manual valve is generated.

In an unmatching range condition, the INH signal that is transmitted from the inhibitor switch 56 to the controller 60 indicates that the select lever 51 is in the D range, but the manual valve is in the N range, and hence no oil pressure is supplied to the clutch piston chamber and the clutch does not enter an engaged state.

In this case, the driver has selected the D range, and therefore depresses the accelerator pedal 75 with the clutch in a non-engaged state. As a result, the driving force of the engine is not transmitted to the driving wheel, leading to engine racing. In this condition, if the driver pushes the select lever 51 even further in the D direction, or the select lever 51 is moved further in the D direction by engine roll occurring as a result of the engine racing, the manual valve 57 may also enter the D range.

In such a case, a INH signal indicating the D range is transmitted from the inhibitor switch 56 at the point when the select lever is operated, and hence this INH signal does not change even if the select lever is pushed further in the D range direction following racing. As a result, normal selection control cannot be performed. However, clutch pressure is supplied due to the position change of the manual valve 57 if the select lever is pushed further in the D range direction following racing, and hence the clutch is engaged. Due to the racing, however, the engine rotation speed increases to a high level, and thus a great engagement shock is generated upon clutch engagement.

The controller 60 is constituted by a microcomputer comprising a central processing unit (CPU) for executing a program, read-only memory (ROM) for storing programs and data, random access memory (RAM) for storing CPU calculation results and obtained data temporarily, a timer for measuring time, and an input/output interface (I/O interface). The controller 60 performs control to reduce the engagement shock that occurs in an unmatching range condition.

If a manual valve position sensor is provided to detect the position of the manual valve, an unmatching range condition can be determined by comparing the output signal of the manual valve position sensor and the INH signal. However, providing a manual valve position sensor leads to a cost increase. In this embodiment, the controller 60 determines an unmatching range condition when engine racing occurs, regardless of the fact that the INH signal indicates the D (R) range (that is, a range other than the N range and P range). In an unmatching range condition, the controller 60 first performs control to remove the clutch pressure, then performs control to reduce the engine torque and rotation speed, and then sets the clutch pressure to an intermediate pressure. Here, the controller 60 is in a standby condition in preparation for a further oil pressure charge to the manual valve. Thus engagement shock is alleviated at no extra cost.

Figure 4:
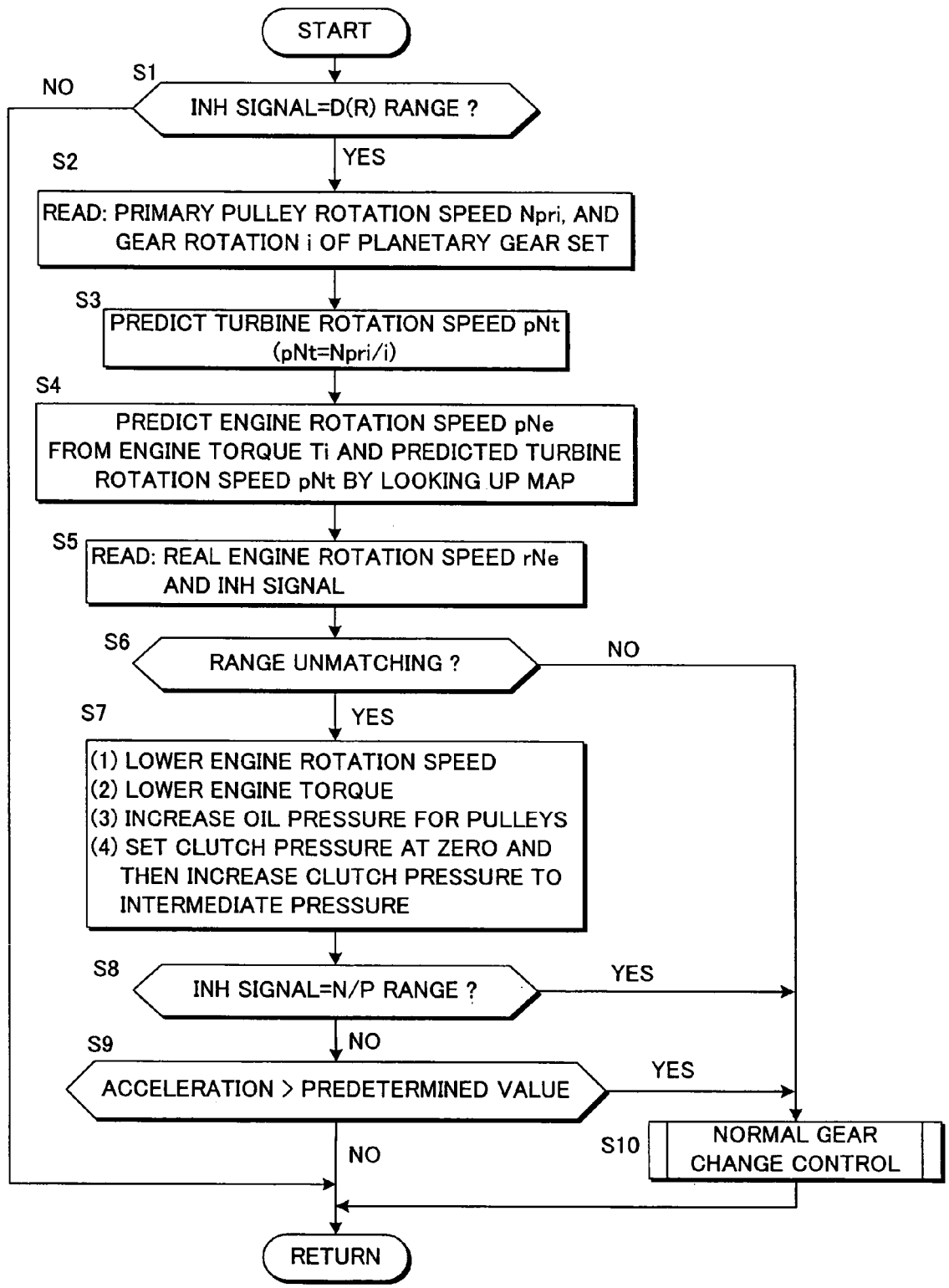
FIG. 4 is a flowchart illustrating a control routine executed by a controller.

Referring to the flowchart in FIG. 4, the control routine executed by the controller 60 will be described. This control routine is realized in the form of a program and executed repeatedly. Here, the D range will be used as an example, but the same applies to the R range. In other words, the R range may be used instead of the D range in the control routine.

In a step S1, a determination is made as to whether the INH signal indicates the D range. If the INH signal does not indicate the D range, the routine ends. If the INH does indicate the D range, the routine advances to a step S2.

In the step S2, the primary pulley rotation speed Npri is read from the primary pulley rotation speed sensor 41d. The gear ratio i of the planetary gear set 31, which is stored in the ROM, is also read. Further, the vehicle speed is determined from the rotation speed of the secondary pulley 42, which is detected by the secondary pulley rotation speed sensor 42d. The vehicle speed is stored in the RAM.

Figure 5:
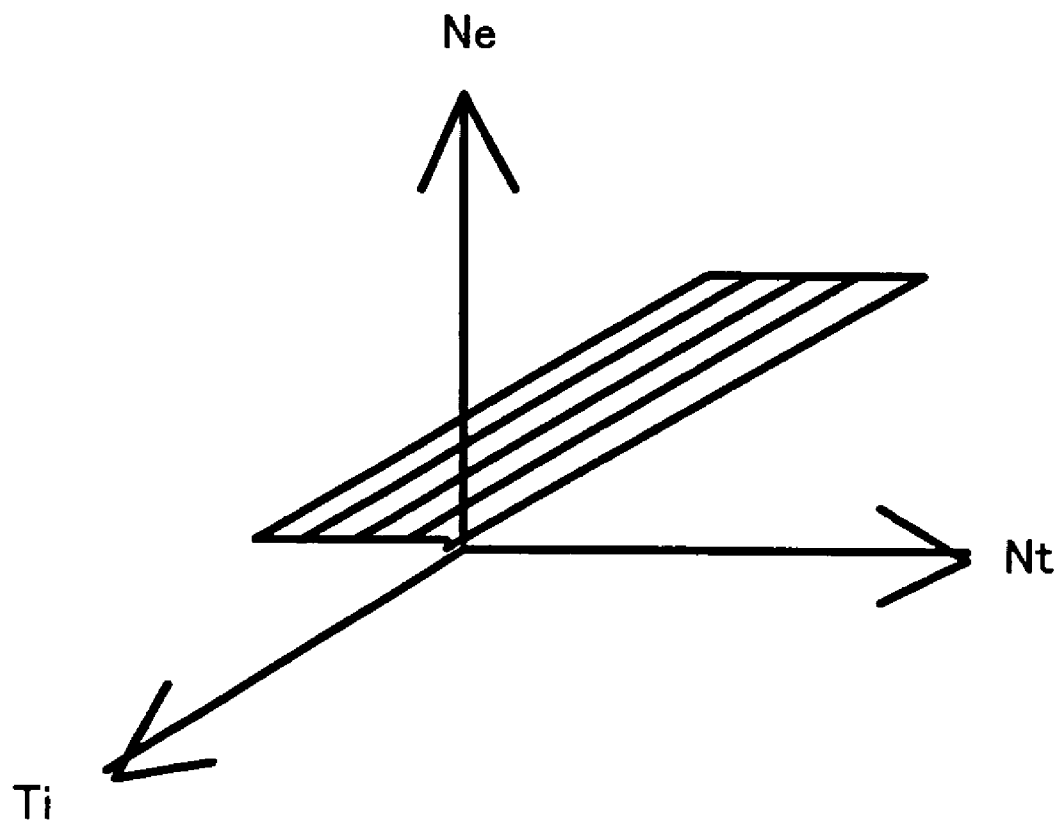
FIG. 5 is a map which shows the relationship of the engine rotation speed Ne to the input torque Ti and turbine rotation speed Nt.

In a step S3, an estimated value pNt of the turbine rotation speed of the turbine liner of the torque converter 20 is calculated on the presumption that the clutch is engaged according to the following equation: pNt=Npri/i Next, in a step S4, an estimated value pNe of the engine rotation speed is calculated with reference to the map in FIG. 5 from the turbine rotation speed estimated value pNt and an input torque Ti that is input into the torque converter 20 from the engine. For example, the input torque Ti is determined on the basis of the fuel injection amount into the engine. The map in FIG. 5 is stored in the ROM, and determines the relationship of the engine rotation speed Ne to the input torque Ti and turbine rotation speed Nt.

Next, in a step S5, the real value rNe of the engine rotation speed is read from the engine rotation speed sensor 71, and the INH signal is also read from the inhibitor switch 56.

Next, in a step S6, a determination is made as to whether or not an unmatching range condition has occurred by comparing the estimated value pNe and the real value rNe of the engine rotation speed. In an unmatching range condition, no oil pressure is supplied to the manual valve 57, and hence engine racing occurs.

More specifically, an unmatching range condition is determined when both of the following conditions (1) and (2) are established.

(1) The real value rNe of the engine rotation speed is larger than a value obtained by adding a margin rotation speed (for example 50–200 rpm) to the estimated value pNe. In other words, rNe>pNe+margin rotation speed.

(2) The INH signal indicates the D range.

In other words, if the condition (1) is satisfied, then the real value is much greater than the estimated value, and hence it can be determined that engine racing is occurring. The condition (2) further indicates that engine racing is occurring in spite of the fact that the shift lever is in the D range. This shows that no oil pressure is being supplied to the clutch piston chamber, or in other words that the supply of oil pressure to the clutch is being blocked by the manual valve.

In an unmatching range condition, the routine advances to a step S7, where standby control is performed. If the ranges match, on the other hand, the routine advances to a step S10, where normal gear change control is performed. In the D range, the normal gear change control increases the clutch pressure to the maximum clutch pressure that can be generated.

In the step S7, the engine rotation speed is suppressed below a threshold (1500–2000 rpm) by means of throttle restriction, fuel cut modification, fuel injection timing retardation, and so on. Control to reduce the engine torque is also performed by reducing the fuel injection amount and so on. Further, the controller 60 switches the instructed value for the clutch pressure that is transmitted to the clutch pressure adjustment device 14 to 0 MPa such that the oil pressure upstream of the manual valve 57 is released and the clutch cannot be engaged. By reducing the clutch pressure in this manner, clutch engagement is retarded, and engagement shock is alleviated. The controller 60 also controls the line pressure adjustment device 11, primary pressure adjustment device 12, and secondary pressure adjustment device 13 to increase the oil pressure supply to the primary and secondary pulleys. In so doing, the maximum transmittable torque of the V-belt 43 is increased.

Once the engine rotation speed and torque have fallen sufficiently, the controller 60 sets the clutch pressure via the clutch pressure adjustment device 14 to an intermediate pressure (in other words, a pressure between the maximum clutch pressure and minimum clutch pressure that can be generated) in preparation for an oil pressure supply to the forward clutch via the manual valve 57, or more specifically, in preparation for the manual valve 57 entering the D range.

Next, in a step S8, a determination is made as to whether or not the INH signal indicates the N or P range. If the determination is positive, the routine advances to the normal control of the step S10. If the determination is negative, the routine advances to a step S9.

In the step S9, a determination is made as to whether or not the acceleration is larger than a predetermined value. The acceleration is determined by change in the vehicle speed over a short period of time. The vehicle speed is determined from the rotation speed of the secondary pulley 42, which is detected by the secondary pulley rotation speed sensor 42d. The difference between the presently determined vehicle speed and the vehicle speed detected in the step S2 may be calculated to obtain the acceleration.

Referring to FIG. 6, the effects of the above control will be described. In FIG. 6, the solid lines indicate a case in which control is performed, and the broken lines indicate a case in which control is not performed (the prior art).

At a time t1, the driver shifts the select lever 51 into the D range, and at a time t2 depresses the accelerator pedal to increase the throttle valve opening Tvo. At this stage, the manual valve remains in the N range. When the range of the select lever and the range of the manual valve do not match in this manner, an unmatching range condition is indicated. In FIG. 6, the unmatching range condition continues from the time t1 to a time t5.

First, the effects of the control performed in the prior art, shown by the broken lines, will be described.

The driver shifts the select lever 51 into the D range (time t1), and then depresses the accelerator, whereby the throttle valve opening Tvo increases (time t2). As a result, the engine rotation speed Ne increases rapidly. Even in this condition, the engine rotation speed and engine torque are not reduced, and hence the engine rotation speed Ne rises as shown by the broken line, leading to engine racing. The engine torque also remains high, as shown by the broken line. When the manual valve enters the D range (time t5) in this state such that the clutch is engaged, the clutch transmission torque increases rapidly, producing a great engagement shock as shown by the broken line in FIG. 6H.

Next, the effects of the control performed in this embodiment, shown by the solid lines, will be described.

The driver shifts the select lever 51 into the D range (time t1), and then depresses the accelerator pedal, whereby the throttle valve opening Tvo increases (time t2). As a result, the engine rotation speed Ne increases rapidly.

Then, if the detected engine rotation speed rNe exceeds the threshold (1500–2000 rpm) (time t3), it is determined that the engine is racing. Thereafter, the engine rotation speed Ne and engine torque are reduced, and the clutch pressure instructed value is reduced to 0 MPa. Further, the primary pressure and secondary pressure are raised, and the maximum transmittable torque is increased.

Once the detected engine rotation speed rNe has reached a predetermined low rotation speed (for example 1500–2000 rpm) (time t4), the clutch pressure is set to an intermediate pressure. In this state, clutch engagement is awaited. When the manual valve enters the D range (time t5), the clutch is engaged. In this case, the engine rotation speed Ne and engine torque are reduced, and the clutch pressure is set to an intermediate pressure, and hence the clutch torque during clutch engagement is suppressed. Moreover, by raising the primary pressure and secondary pressure, and increasing the maximum transmittable torque, precise control can be performed.

In the embodiment described above, an example in which this invention is applied to a belt CVT was described, but similar effects can be obtained when the invention is applied to a toroidal CVT or a planetary automatic transmission.

The entire contents of Japanese Patent Application P2003-52713 (filed Feb. 28, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A clutch engagement control device which controls the engagement of a forward clutch and reverse clutch in an automatic transmission connected to an engine in a vehicle; the forward clutch being capable of transmitting a drive force of the engine for advancing the vehicle and the reverse clutch being capable of transmitting the drive force of the engine for reversing the vehicle; wherein operating ranges of the automatic transmission include a drive range which advances the vehicle, a reverse range which reverses the vehicle and a stopping range which stops the vehicle, the clutch engagement control device comprising:

a selecting switch which selects the operating range of the automatic transmission; a position range of the selecting switch indicating the selected operating range of the automatic transmission;

an inhibitor switch which outputs a range signal in accordance with the position range of the selecting switch, the range signal indicating the position range of the selecting switch;

a manual valve which supplies oil pressure selectively to one of the forward clutch and the reverse clutch by changing position in accordance with the position range of the selecting switch; position ranges of the manual valve including a drive range in which only the forward clutch is engaged, a reverse range in which only the reverse clutch is engaged, and a stopping range in which both the forward clutch and reverse clutch are released;

an oil pressure adjustment device which adjusts an oil pressure that is supplied to the manual valve; and a controller electrically coupled to the engine and the oil pressure adjustment device, the controller functioning to:

determine whether an unmatching range condition occurs in which the range of the selecting switch indicated by the range signal and the range of the manual valve do not match, when the range of the selecting switch indicated by the range signal is the drive range or reverse range; and suppress an increase in engine rotation speed prior to engagement of the forward clutch or reverse clutch when the unmatching range condition occurs.

2. The clutch engagement control device as defined in claim 1, wherein the controller performs control to reduce the engine rotation speed prior to engagement of the forward clutch or reverse clutch when the unmatching range condition occurs.

3. The clutch engagement control device as defined in claim 1, wherein the controller performs control to reduce the engine torque prior to engagement of the forward clutch or reverse clutch when the unmatching range condition occurs.

4. The clutch engagement control device as defined in claim 1, wherein, prior to engagement of the forward clutch or reverse clutch when the unmatching range condition occurs, the controller controls the oil pressure adjustment device such that the oil pressure supplied to the manual valve is set to zero, and then controls the oil pressure adjustment device such that the oil pressure supplied to the manual valve is set to an intermediate pressure.

5. The clutch engagement control device as defined in claim 1, wherein the automatic transmission comprises a belt continuously variable transmission constituted by a primary pulley, a secondary pulley, and a V-belt, and a second oil pressure adjustment device which adjusts the pressure that is applied to the primary pulley and the pressure that is applied to the secondary pulley, and prior to engagement of the forward clutch or reverse clutch when the unmatching range condition occurs, the controller controls the second oil pressure adjustment device to increase the pressure that is applied to the primary pulley and the pressure that is applied to the secondary pulley, whereby the maximum transmittable torque of the V-belt is increased.

6. The clutch engagement control device as defined in claim 1, wherein the controller determines an occurrence of an unmatching range condition when the range signal from the inhibitor switch indicates the drive range or reverse range, and when the engine is in a racing condition.

7. The clutch engagement control device as defined in claim 2, further comprising a sensor which detects a rotation speed of the engine, wherein the controller estimates a value of the engine rotation speed on the presumption that the clutch is engaged, and determines that the engine is in the racing condition on the basis of a real value and the estimated value of the engine rotation speed.

8. A clutch engagement control device which controls the engagement of a forward and reverse clutch in an automatic transmission connected to an engine in a vehicle; the forward clutch being capable of transmitting a drive force of the engine for advancing the vehicle and the reverse clutch being capable of transmitting the drive force of the engine for reversing the vehicle; wherein operating ranges of the automatic transmission include a drive range which advances the vehicle, a reverse range which reverses the vehicle and a stopping range which stops the vehicle, the clutch engagement control device comprising:

selection means for selecting the operating range of the automatic transmission; a position range of the selection means indicating the selected operating range of the automatic transmission;

means for outputting a range signal in accordance with the position range of the selection means, the range signal indicating the position range of the selection means;

supply means for supplying oil pressure selectively to one of the forward clutch and the reverse clutch by changing position in accordance with the operating range of the selection means; position ranges of the supply means including a drive range in which only the forward clutch is engaged, a reverse range in which only the reverse clutch is engaged, and a stopping range in which both the forward clutch and reverse clutch are released;

means for adjusting an oil pressure that is supplied to the supply means;

means for determining whether an unmatching range condition occurs in which the range of the selection means indicated by the range signal and the range of the supply means do not match, when the range of the selection means indicated by the range signal is the drive range or reverse range; and means for suppressing an increase in engine rotation speed prior to engagement of the forward clutch or reverse clutch when the unmatching range condition occurs.

9. A clutch engagement control method for controlling the engagement of a forward and reverse clutch in an automatic transmission connected to an engine in a vehicle; the forward clutch being capable of transmitting a drive force of the engine for advancing the vehicle and the reverse clutch being capable of transmitting the drive force of the engine for reversing the vehicle; wherein operating ranges of the automatic transmission include a drive range which advances the vehicle, a reverse range which reverses the vehicle and a stopping range which stops the vehicle, the vehicle comprising:

a selecting switch which selects the operating range of the automatic transmission; a position range of the selecting switch indicating the selected operating range of the automatic transmission;

an inhibitor switch which outputs a range signal in accordance with the position range of the selecting switch, the range signal indicating the position range of the selecting switch;

a manual valve which supplies oil pressure selectively to one of the forward clutch and the reverse clutch by changing position in accordance with the operating range of the selecting switch; position ranges of the manual valve including a drive range in which only the forward clutch is engaged, a reverse range in which only the reverse clutch is engaged, and a stopping range in which both the forward clutch and reverse clutch are released;

an oil pressure adjustment device which adjusts an oil pressure that is supplied to the manual valve; and the clutch engagement control method comprising the steps of:

determining whether an unmatching range condition occurs in which the range of the selecting switch indicated by the range signal and the range of the manual valve do not match, when the range of the selecting switch indicated by the range signal is the drive range or reverse range; and suppressing an increase in engine rotation speed prior to engagement of the forward clutch or reverse clutch when the unmatching range condition occurs; and controlling the oil pressure adjustment device such that a clutch pressure supplied to the manual valve is set to zero and subsequently controlling the oil pressure adjustment device such that the oil pressure supplied to the manual valve is set to an intermediate pressure, prior to engagement of the forward clutch or reverse clutch when the unmatching range condition occurs.

* * * * *